(12) United States Patent
Summey et al.

(10) Patent No.: US 10,079,113 B2
(45) Date of Patent: Sep. 18, 2018

(54) CAPACITOR AND METHOD OF MANUFACTURE UTILIZING MEMBRANE FOR ENCAPSULANT THICKNESS CONTROL

(71) Applicant: KEMET Electronics Corporation, Simpsonville, SC (US)

(72) Inventors: Brandon Summey, Simpsonville, SC (US); Jeffrey Poltorak, Simpsonville, SC (US); Robert Andrew Ramsbottom, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 7 days.

(21) Appl. No.: 15/381,526

(22) Filed: Dec. 16, 2016

(65) Prior Publication Data

US 2017/0178821 A1 Jun. 22, 2017

Related U.S. Application Data

(60) Provisional application No. 62/269,646, filed on Dec. 18, 2015.

(51) Int. Cl.
| | |
|---|---|
| *H01G 9/012* | (2006.01) |
| *H01G 9/15* | (2006.01) |
| *H01G 9/00* | (2006.01) |
| *H01G 9/042* | (2006.01) |
| *H01G 9/048* | (2006.01) |
| *H01G 9/07* | (2006.01) |
| *H01G 9/08* | (2006.01) |
| *H01G 9/045* | (2006.01) |

(52) U.S. Cl.
CPC ........... *H01G 9/012* (2013.01); *H01G 9/0032* (2013.01); *H01G 9/042* (2013.01); *H01G 9/048* (2013.01); *H01G 9/07* (2013.01); *H01G 9/08* (2013.01); *H01G 9/15* (2013.01); *H01G 9/045* (2013.01)

(58) Field of Classification Search
CPC ...... H01G 9/012; H01G 9/0032; H01G 9/042; H01G 9/048; H01G 9/07; H01G 9/08; H01G 9/15; H01G 9/045; H01G 2/10
See application file for complete search history.

(56) References Cited

U.S. PATENT DOCUMENTS

| | | |
|---|---|---|
| 3,916,434 A | 10/1975 | Garboushian |
| 6,185,091 B1 | 2/2001 | Tanahashi et al. |
| 6,281,023 B2 | 8/2001 | Eastep et al. |
| 6,771,488 B2 | 8/2004 | Takagi et al. |
| 6,819,546 B2 | 11/2004 | Kuriyama |

(Continued)

OTHER PUBLICATIONS

ISA/US; International Search Report prepared for PCT/US2016/067255; Applicant: KEMET Electronics Corporation; dated Apr. 21, 2017.

*Primary Examiner* — Dion R Ferguson
(74) *Attorney, Agent, or Firm* — Joseph T. Guy; Patent Filing Specialist, Inc.

(57) ABSTRACT

An improved capacitor is provided wherein the capacitor has improved volumetric efficiency. The capacitor comprises a capacitive element comprising an anode, a dielectric on the anode and a cathode on the dielectric. An encapsulant at least partially encases the capacitive element wherein the encapsulant comprises at least one membrane between the capacitive element and an external surface of the encapsulant.

65 Claims, 10 Drawing Sheets

(56) References Cited

U.S. PATENT DOCUMENTS

| | | | |
|---|---|---|---|
| 7,161,797 B2 | 1/2007 | Vaisman et al. | |
| 7,495,890 B2 | 2/2009 | Chacko | |
| 8,437,117 B2 | 5/2013 | Umemoto et al. | |
| 8,503,165 B2 | 8/2013 | Chacko | |
| 2004/0085712 A1* | 5/2004 | Tadanobu | H01G 9/012 361/523 |
| 2010/0165547 A1 | 7/2010 | Kuranuki et al. | |
| 2012/0257329 A1* | 10/2012 | Biler | H01G 9/012 361/528 |
| 2015/0049419 A1* | 2/2015 | Biler | H01G 9/025 361/525 |
| 2016/0268049 A1* | 9/2016 | Petrzilek | H01G 4/224 |

* cited by examiner

CAPACITOR AND METHOD OF MANUFACTURE UTILIZING MEMBRANE FOR ENCAPSULANT THICKNESS CONTROL

CROSS-REFERENCE TO RELATED APPLICATIONS

This application claims the priority benefit under 35 U.S.C. section 119 of U.S. Provisional Patent Application No. 62/269,646 filed on Dec. 18, 2015 which is incorporated by reference.

FIELD OF THE INVENTION

The present invention is related to capacitors and methods for manufacturing capacitors, preferably valve metal capacitors, which provides an improvement in volumetric efficiency while maintain or improving electrical performance. Even more specifically, the present invention provides an improved capacitor, and method of forming an improved capacitor with improved volumetric efficiency obtained through the use of membranes that form a controllable thickness between the capacitive elements and the external capacitor surface, through the encapsulant.

BACKGROUND

It is standard practice in the manufacture of valve metal capacitors, particularly surface mount valve metal capacitors, to form a monolithic structure comprising an anode wire extending from an anode wherein a dielectric and charge collecting cathode is on the surface of the anode with the dielectric between the anode and cathode. The anode will typically have a roughened or increased surface area, on which the dielectric and cathodes are formed, so as to increase the capacitance of the device. The manufacturing process includes attaching an anode lead, extending from the anode, to a lead frame at a first location and attaching the cathode to a lead frame at a second location.

It is necessary for the anodic components and the cathodic components to be sufficiently separated to avoid electrical arcing as would be readily understood. This requirement creates a loss in volumetric efficiency since a significant volume of the ultimate capacitor does not contribute to capacitance. For example, with reference to FIG. 1A, the volume of the capacitor which surrounds the anode lead, 3, extending from the anode face from which the anode lead extends to the outer edge of the encapsulant, 8, provides no electrical purpose and only functions to provide a location for attachment of the lead frame, 4, to the anode lead with sufficient separation from the cathode layers to avoid damage during welding. This problem is exacerbated by the necessity to provide enough separation between the active area of the capacitive element and the weld, 9, in order to ensure that the effects of the weld operation, radiating unabated through the environment towards the sensitive and unprotected dielectric and cathodic layers, do not degrade the quality and performance of those layers. Shielding of the element from the weld process does not prove beneficial in reducing the occupied volume because practical limits of manufacturing precision prevent shortening of the distance required beyond that required without shielding. When multiple capacitive elements are combined into one capacitor the volumetric efficiency is even further eroded.

Electronic device manufacturers, who are the primary purchasers of surface mount capacitors, have a large installed manufacturing infrastructure tailored to mounting a surface mount capacitor onto a circuit board, or related element, to form an electrical sub assembly. Therefore, it is a necessity to provide capacitors which are structurally similar to surface mount capacitors as currently employed. Particularly the size, shape, and dimensions of the device must be consistent with the installed base for use in existing attachment locations. The electronics industry is also constantly seeking to miniaturize electronic devices, or extract greater capacity and capability from the same size devices. This forces the manufacturer of components, such as capacitors, to seek more functionality in a given volume. These contradictory requirements have led to the desire for a surface mount capacitor which has a higher volumetric efficiency, or capacitance per unit volume, while mimicking an industry standard surface mount capacitor in size and lead orientation. To address the loss in volumetric efficiency due to the anode attachment to its respective leadframe, some manufacturers have attempted to locate the attachment outside of the encapsulant. Some methods of connecting an anode extension to a preexisting external terminal, external to an encapsulant, have been proposed in U.S. Pat. Nos. 6,819,546 and 7,161,797 both of which are incorporated herein by reference. These methods involve forming a portion of the traditional lead frame material with the anode and cathode adhered to the leadframe, or equivalent, embedded in the encapsulant, and connecting the edge of the terminal to the exposed anode extension with a conductive layer applied onto the end of the device.

Other methods of construction are provided in U.S. Publ. Appl. No. 2010/0165547 which is incorporated herein by reference. Described therein is a device wherein the anode extension, and a portion of the applied conductive cathode, is exposed outside of the protective encapsulant. The end surfaces of the device from which the anode extension(s) and cathode layer are exposed are then flame sprayed, and subsequently made solderable, to create a terminal on each end of the device. This applied terminal material exists only on the end faces of the device, and does not have a significant presence on the bottom, or mounting surface, of the device. The terminals also cover the entire end faces of the device. This design represents a valve metal device with the terminal structure of a multi-layered ceramic capacitor (MLCC) device. These terminal configurations are undesirable in the art, as these devices are not interchangeable with the industry standard termination specifications for surface mount capacitors. Furthermore, these terminal configurations are undesirable because the terminals extend the full width of the device. Per industry standards, the mounting pad on the printed circuit board is always narrower than the device terminal as this provides a stabilizing effect on the device during the soldering process when mounting the device to a printed circuit board (PCB). When the terminal extends the full width of the device the mounting pad on the printed circuit board is wider than the device effectively requiring more space on the circuit board than can ever be filled by the capacitive device with this terminal configuration resulting in less than ideal volumetric efficiency. Thus, a device that has terminals that are significantly narrower than the width of the device requires mounting pads on the printed circuit board that are narrower than the capacitive device, and thus require less space on the PCB, resulting in greater volumetric efficiency of the PCB. It is preferred that a device would conform to the industry standard and preferably the device terminal would be 0.4 mm, or more, narrower than the device case. Terminal configurations in which the terminal reaches the top surface of the device, as those disclosed in U.S. Pat. Nos. 6,819,546 and 7,161,797, and U.S. Publ. Appl. No. 2010/0165547 are also undesirable due to a common condition of modern electronic devices exhibiting RF transmission, or those sensitive to external RF and EM interference, as in cellular telephones where conductive metal grounded shielding is placed over the circuit board to mitigate such problems. In these devices, the shielding can come into contact with the top of the devices mounted to the PCB. Therefore, devices with terminals reaching the top of the device provide a potential electrical path between the terminals and the grounded shield thereby rendering the device and the circuit inoperable.

Other methods of constructing surface mount solid electrolytic capacitors have been proposed such as those described in U.S. Pat. No. 6,185,091 which is incorporated herein by reference. These teachings still lead to volumetric inefficiencies. The focus is a construction with performance improvement related to its impact on an electrical circuit. The design requires the attachment of anode and cathode extensions. These teachings describe terminals that are mechanically attached prior to encapsulation. As described above this occupies space inside the encapsulation that lowers the volumetric efficiency of the device. In addition, no methods of attachment are taught and must be assumed to follow conventional methods of attachment that have no advantage in volumetric efficiency.

In addition to the volumetric efficiency advantage gained from the method of attachment of the anode and cathodes, the encapsulation method plays a large role in the devices final volumetric efficiency. Many ways are used in the art to produce a thin wall of encapsulant on the active element to protect the active element from the environment. Traditional methods include injection molding around the element such that the element is suspended within the injection molding cavity. This method fails in improving efficiency as features that are part of the process of suspending the elements in the cavities must be substantial enough to support the elements, and thus are incorporated within the device occupying space not used for active capacitance. An example of this space occupying material is the leadframe. The leadframe must extend inside the package to support the element and its ability to support the element is related to its thickness. Additionally, methods known as facedown use one side of the leadframe, opposite of the capacitive element, to be supported against the molding cavity, thus reducing its required thickness for supporting the element. However, decreasing the thickness of the facedown leadframe is limited by its ability to be adhesively bound to the encapsulant and by the thickness required to mechanically lock the leadframe with the encapsulant. If either of these aspects are lacking, due to trying to improve the volumetric efficiency, then the external forces on the capacitor terminals are transferred directly to the internal elements with potential of damage occurring. These factors limit the volumetric efficiency improvements, specifically around the thickness dimension of the device. Additionally, the leadframe configuration within the facedown design does not address the difficulty in controlling the encapsulant thickness on the side of the element opposite the facedown leadframe. This thickness is still controlled by the injection molding process.

The injection molding process is a process by which resin is brought into a cavity within which the capacitive elements have been suspended. This suspension is typically done by supporting portions of the traditional terminations of the leadframe or such, as in facedown packaging, by the compression of the leadframe down to a surface and the injection cavity located opposite of that surface. One issue with this process is that the resin is then presented to the cavity either directly within the capacitor cavity at the site of a long aspect ratio region or outboard of this capacitor cavity where resin does not enter at the site of a long aspect ratio region. If the resin is presented within a portion of the capacitor cavity the portion of the resin, which is in contact with the cavity portion of the device, must later be removed so as to not be part of the finished device. This removal process can both impact the electrical performance or the final target dimension capability and is made further difficult as the resin wall thickness is reduced in miniaturization. In addition, steps taken to remove this portion can add cost and complexity, especially when trying to control the final dimensions, as an ongoing goal in the art. If the injected resin is presented outbound of the cavity, then the major constraint to the process is the resin's ability to be flowed into long aspect ratio cavities. As is the goal in miniaturization, the resin wall between the capacitive element and external environment is preferably made as small as possible. In this case of standard capacitors in the industry it is possible to have regions of the cavity in which resin must flow 100 times or more in length versus the thickness of the wall attempting to be injected too. This long aspect ratio makes it difficult to fill due to back pressure created from the flow and its effects on the other flow characteristics in the remaining portion of the cavity, thereby risking more mixing of the resin adjacent to the heated cavity die possibly causing the material to cure prematurely.

It is possible to achieve process conditions, and materials, that allow for the long aspect ratio fills between the cavity and the elements, however, as stated this typically results in a high pressure being required to transfer the material across these long portions of the capacitive element and may add to the cost and complexity of the materials used. This high pressure can also create a series of unwanted characteristics. If the long aspect ratio exists on two sides of the capacitive elements, then the practicality of having evenly balanced pressures is poor and thus the capacitive elements may be biased to one side of the encapsulant. This bias takes away from the overall thickness potential of the final component as the final component will typically require a minimum encapsulant wall thickness. Further difficulties in processing parts with such a long aspect filling ratio is that the pressure created during the time the material is filling through the long aspect portion can result in stress being applied to the element risking damage to the element or forcing it to move within the package, resulting in poor quality and/or poor efficiency.

Another method of achieving good fill over longer aspect ratios is pre-filling the cavity with a liquid resin and lowering the cavity to a fixed height and forcing the liquid resin out of the cavity, leaving only the desired amount of resin defined by the lowering of the cavity and other fixed portions with the cavity. The limitation with this method is that when trying to achieve very thin walls of encapsulant the manufacturing variation of each capacitive element will limit the achievable wall thickness due to maintaining the minimum wall thickness for every part requires that the cavity thickness for the encapsulant be fixed for the largest of the variation within the capacitive elements. To process each element with varying height control is impractical and leaving some finished components with too thin of a encapsulant wall could have failures later in the process.

Other methods disclosed include the use of resin sheets to provide resin directly to the portions of the encapsulant so that the resin does not have to traverse the long aspect ratio portions of the device as described in U.S. Pat. No. 7,595, 235 which is incorporated herein by reference. This process is helpful in reducing the effects of the encapsulant resin movement due to the resin being distributed over the capacitive element surface prior to flowing the resin into place. This method helps in reducing this stress at the encapsulation process but still lacks finer control of the encapsulant thickness without a method to control the final cavity dimensions that form the thickness of the capacitor.

As set forth above, there is an ongoing desire for a device with improved volumetric efficiency while maintaining the exact terminal configuration consistent with industry standards for valve metal surface mount capacitors. In spite of the extensive efforts there is still a desire for increased volumetric efficiency and improvements in the electrical performance of capacitors. Such improvements are provided herein.

SUMMARY OF THE INVENTION

The present invention provides an improved capacitor and method of manufacturing an improved capacitor.

A particular feature of the invention is the presentation of a device with a construction, and method of constructing, wherein the volume occupied by the encapsulant is significantly reduced thereby increasing the volumetric efficiency without detriment to the function of the capacitor.

One embodiment of the present invention is a capacitor comprising at least one anode comprising a valve metal or conductive oxide of a valve metal, and an anode lead. A dielectric is formed on the anode and a cathode layer is formed on the dielectric. The capacitive element is attached to a leadframe, wherein the anode lead is electrically attached to the leadframe on an anode portion of the leadframe and the cathode of the capacitive element is attached to the cathode portion of the leadframe, typically by conductive adhesive. A membrane layer is between the external capacitor device surface and the capacitive element on two, opposite sides of the device such that the membrane provides a fixed thickness of the encapsulant in the thickness dimension of the capacitor device.

Yet another embodiment of the present invention is provided in a capacitor comprising at least one anode comprising a valve metal or conductive oxide of a valve metal, and an anode lead. A dielectric formed on the anode and a cathode layer formed on the dielectric. The capacitive element is attached to a leadframe, wherein the anode lead is electrically attached to the leadframe on an anode portion of the leadframe and the cathode of the capacitive element is attached to the cathode portion of the leadframe, typically by conductive adhesive. The capacitive element is attached to one side of the leadframe. The surface of the leadframe attached to the capacitive element is embedded in an encapsulant and a membrane layer is between the external capacitor device surface and the capacitive element on opposite side of the device from the leadframe such that the membrane provides a fixed thickness of the encapsulant in the thickness dimension of the capacitor device. In such a device the leadframe and membrane both provide a portion of the device thickness control when the encapsulant forming cavity compresses the device in the thickness dimension during the encapsulation process.

Yet another embodiment of the present invention is a capacitor comprising at least one anode comprising a valve metal or conductive oxide of a valve metal, and an anode lead. A dielectric is formed on the anode and a cathode is layer formed on the dielectric wherein the cathode layer comprises a cathode current collecting layer, preferably foil, that extends beyond the ends of the anode portion of the capacitive element. The capacitive element(s) are encapsulated between two membrane layers wherein the membrane layer is impregnated with encapsulating resin. The encapsulated structure is modified in such a way as to expose a portion of the anode leads of the capacitive elements on one surface of the device and a portion of the cathode current collecting layer on another, or the same, surface of the device. The exposed portions of the anode lead(s) and cathode current collecting layer(s) are treated to form a metal plated layer on the said portions of the capacitive element(s). Preformed metal terminals are attached to the metal plated layers, preferably by soldering.

Yet another embodiment of the present invention is provided in a capacitor comprising at least one anode comprising a valve metal or conductive oxide of a valve metal, and an anode lead. A dielectric is formed on the anode and a cathode layer is formed on the dielectric. The capacitive element(s) are encapsulated between two membrane layers wherein the membrane layer is impregnated with encapsulating resin and a foil, and preferably a copper foil, on one side of the device and the membranes are in contact with the capacitive element and the external surface of the device or the foil on respective sides of the device. A hole is formed from the external surface of the device encapsulant layer through the encapsulant and membrane such that it intersects the cathode of the capacitive element and another hole is formed through the encapsulant layers and through the anode lead. The holes are formed from the same side as the foil. This hole is metalized by way of plating that adheres to the encapsulant and forms an electrical connection with the perpendicular surface of the anode lead and the foil. A similar metalized hole forms an electrical connection between the cathode of the capacitive element and the foil. The foil is etched in a pattern that electrically disconnects the anode and cathode portions on the surface of the device so as to form terminals. The copper is then treated in such a way as to present it as a solderable surface.

Yet another embodiment of the present invention is a capacitor comprising at least one anode comprising a valve metal or conductive oxide of a valve metal, and an anode lead. A dielectric is formed on the anode and a cathode layer is formed on the dielectric where in the cathode layer comprises cathode current collecting layer(s), preferably foil, that extend beyond the end of the anode portion of the capacitive element. The capacitive element(s) encapsulated between two membrane layers and a foil, preferably a copper foil, on one side of the device. The membranes are in contact with the capacitive element and the external surface of the device or the foil on respective sides of the device. A hole is formed from the external surface of the foil through the encapsulant and membrane and through the anode lead(s). This hole is metalized by way of plating that adheres to the encapsulant and forms an electrical connection with the perpendicular surface of the anode lead(s) and the foil. A similar metalized hole forms an electrical connection between cathode layers, preferably through the current collecting layer(s), and the foil. The foil may be etched in a pattern that electrically disconnects the anode and cathode portions on the surface of the device so as to form terminals. The foil is then treated in such a way to present it as a solderable surface.

An embodiment of the invention is provided in a capacitor. The capacitor comprises a capacitive element comprising an anode, a dielectric on the anode and a cathode on the dielectric. An encapsulant at least partially encases the capacitive element wherein the encapsulant comprises at least one membrane between the capacitive element and an external surface of the encapsulant.

Yet another embodiment is provided in a capacitor comprising a capacitive element comprising an anode, an anode lead extending from said anode, a dielectric on said anode; and a cathode on said dielectric. An encapsulant is on at least a portion of the capacitive element and an anode terminal is on a face of the encapsulant. A first metallized hole is through the encapsulant wherein the first metallized hole extends through the anode lead and electrically connects the anode lead and anode terminal.

Yet another embodiment is provided in a method for forming a capacitor. The method comprises:

forming a capacitive element comprising: an anode, a dielectric on the anode and a cathode on dielectric; and encapsulating at least a portion the capacitive element in an encapsulant wherein the encapsulant comprises at least one membrane.

DESCRIPTION

The present invention provides a capacitor with improved volumetric efficiency and a method for manufacturing the capacitor. The method includes an improved method for controlling the encapsulant wall between the capacitor element and external surface of the encapsulant through the use of a membrane. The method also includes an improved method for attachment of the anode lead of the capacitive element to the external anode terminal with significantly increased volumetric efficiency thereby providing for an increase in the size of the capacitive region of the element, relative to the overall size, while also maintaining, or improving, electrical performance. More specifically, the present invention provides for a capacitor, and method of making the capacitor comprising connectivity of the anode lead to an external termination through a hole, or void, through the encapsulant and anode lead.

The invention will be described with reference to the various figures forming an integral, but non-limiting, component of the specification. Throughout the various figures similar elements will be numbered accordingly.

Figure 1A:
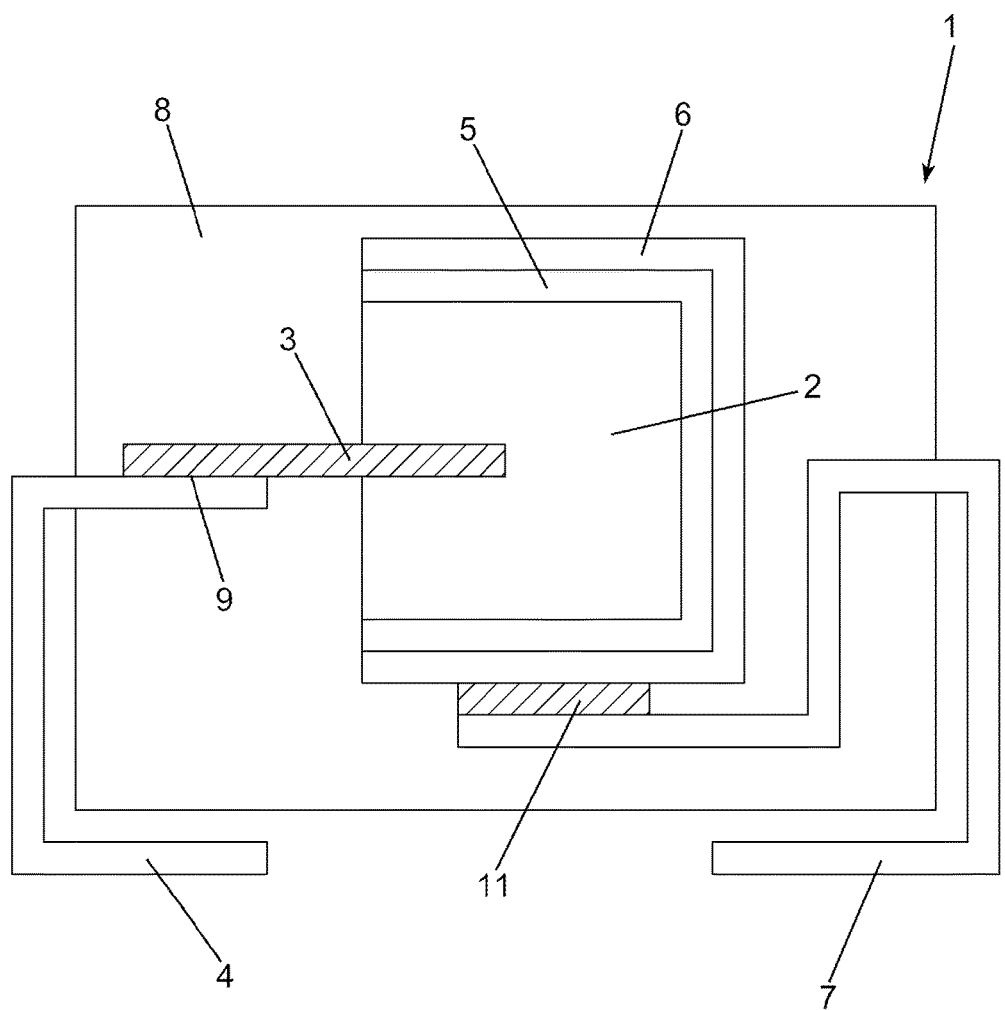
FIG. 1a schematically illustrates a prior art surface mount capacitor.

FIG. 1A schematically illustrates a prior art surface mount capacitor, 1, in cross-sectional view. In FIG. 1A, the anode, 2, has an anode lead, 3, extending therefrom. The anode lead is electrically connected to an anode leadframe, 4, typically by welding, 9. A dielectric, 5, on at least a portion of the anode separates the anode from a cathode, 6. The cathode is electrically connected to a cathode leadframe, 7, by conductive adhesive, 11, and the entire structure, except for the contact portions of the anode leadframe and cathode leadframe, is encased in a non-conducting encapsulant, 8. The anode leadframe, 4, and cathode leadframe, 7, preferably originate as a portion of a near-continuous lead frame in the form of an array, as is well documented in the art, with multiple anode leads and cathode leads integral to a common lead frame. The anode and cathode leads are electrically disconnected when capacitors are singulated such as by dicing.

Figure 1B:
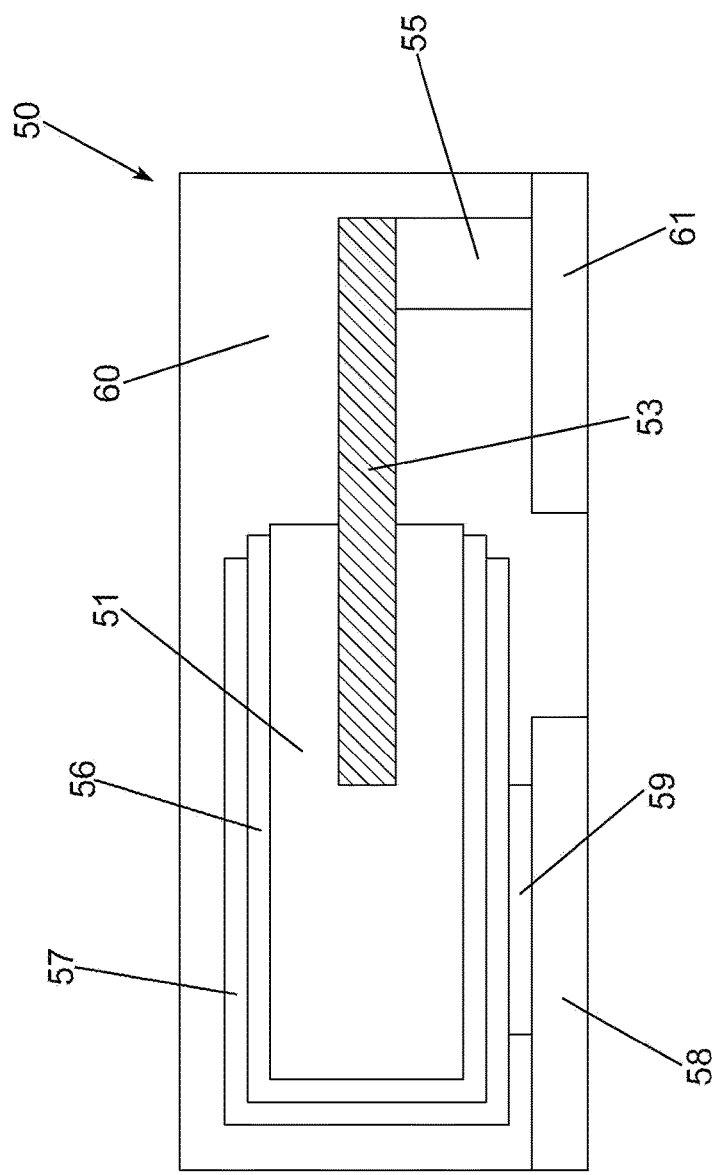
FIG. 1b schematically illustrates a prior art facedown surface mount capacitor.

FIG. 1B schematically illustrates a prior art facedown surface mount capacitor, 50, in cross-sectional view. In FIG. 1B, the anode, 51, has an anode lead, 53, extending therefrom. The anode lead is electrically connected to an anode leadframe tab, 55, typically by welding. A dielectric, 56, on at least a portion of the anode separates the anode from a cathode, 57. The cathode is electrically connected to a cathode leadframe, 58, by conductive adhesive, 59, and the entire structure, except for the contact portions of the anode leadframe and cathode leadframe, is encased in a non-conducting encasement, 60. The anode leadframe, 61, and cathode leadframe, 58, preferably originate as a portion of a near-continuous lead frame in the form of an array, as is well documented in the art, with multiple anode leads and cathode leads integral to a common lead frame. The anode and cathode leads are electrically disconnected when capacitors are singulated such as by dicing.

Figure 1C:
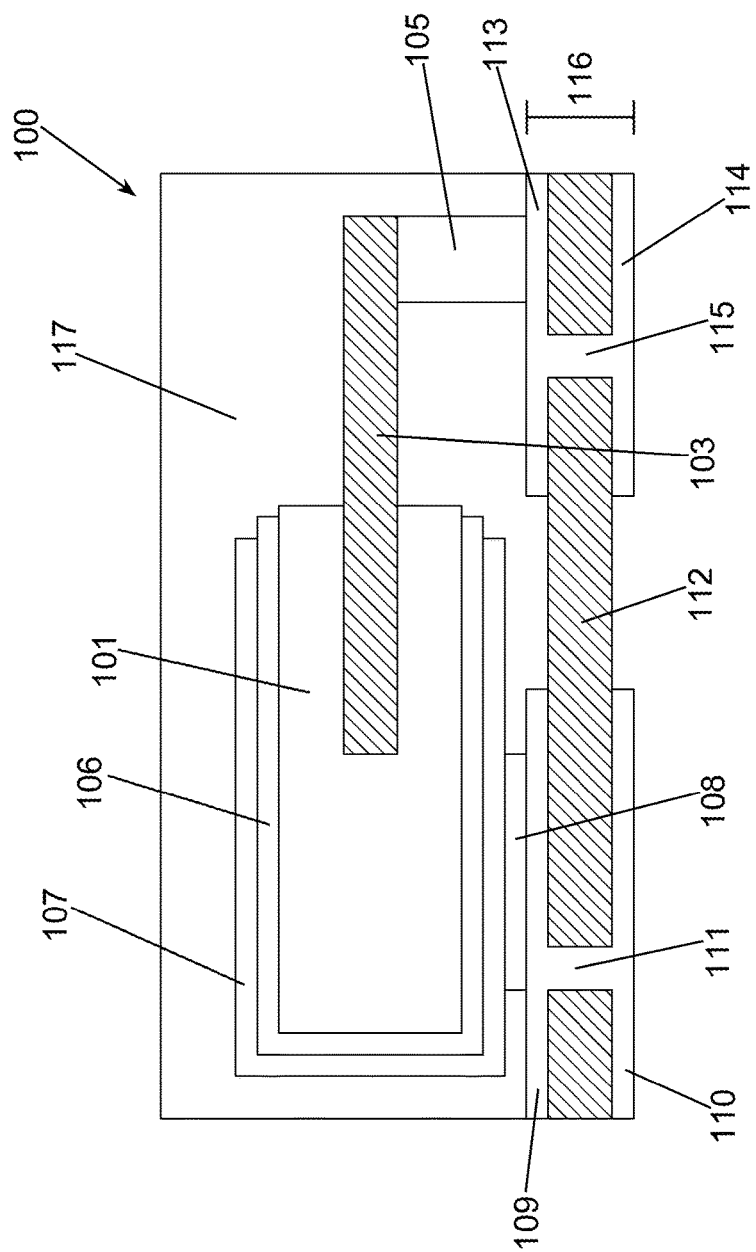
FIG. 1c schematically illustrates a prior art substrate structure surface mount capacitor.

FIG. 1C schematically illustrates, in cross-sectional view, a prior art surface mount capacitor, 100, on a substrate, 116. In FIG. 1C, the anode, 101, has an anode lead 103, extending therefrom. The anode lead is electrically connected to an anode spacer, 105, typically by welding. A dielectric, 106, on at least a portion of the anode separates the anode from a cathode, 107. The cathode is electrically connected to an internal cathode pad, 109, by conductive adhesive, 108. The internal cathode pad is electrically connected to the external cathode terminal, 110, by the cathode electrical path, 111, typically formed by plating a hole in the substrate, 112. The internal anode pad, 113, is electrically connected to the external anode terminal, 114, by the anode electrical path, 115, typically formed by plating a hole in the substrate, 112. The anode spacer, 105, is electrically connected to the anode lead, 103, and electrically connected to the internal anode pad, 113, typically by welding or soldering. The entire structure, except for substrate assembly, 116, that comprises the internal anode and cathode pads, external anode and cathode terminals, anode and cathode electrical paths, and substrate is encapsulated in non-conducting encapsulant, 117. At least portions of the internal anode and cathode pads, and a portion of the substrate, are in contact with the non-conducting material to form a device with portions of the external anode and cathode terminals exposed on the bottom surface of the device.

Figure 1D:
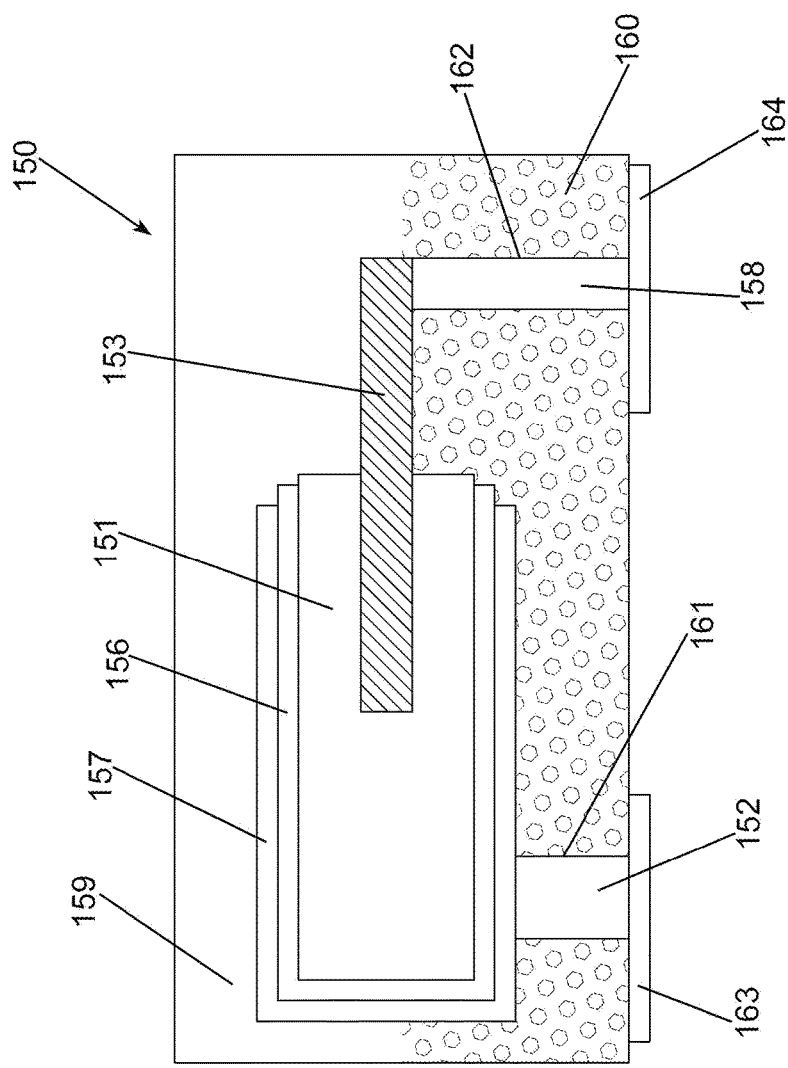
FIG. 1d schematically illustrates a prior art resin sheet structure surface mount capacitor.

FIG. 1D schematically illustrates a prior art resin sheet structure surface mount capacitor, 150, in cross-sectional view. In FIG. 1D, the anode, 151, has an anode lead, 153, extending therefrom. A dielectric, 156, on at least a portion of the anode separates the anode from a cathode, 157. The capacitive element comprises the anode, anode lead, dielectric and cathode. The capacitive element is encapsulated with a non-conductive adhesive, comprised of two resin layers, a top resin layer, 159, and a bottom resin layer, 160. Hole, 161 is formed in the bottom resin layer, 160, to the cathode, 157, and metalized to form an electrical connection, 152, between the cathode, 157, and external cathode terminal, 163. Hole, 162, is formed to the anode lead, 153, and metalized to form an electrical connection, 158, between the anode lead, 153, and the external anode terminal, 164.

The prior art assemblies illustrate the typical construction methods of solid electrolytic valve metal capacitors which utilize a leadframe or plated terminations to terminate the device. The inventive devices are intended to be a direct replacement for the prior art and therefore preferably match the terminal configurations of the prior art while improving the volumetric efficiency.

Figure 2:
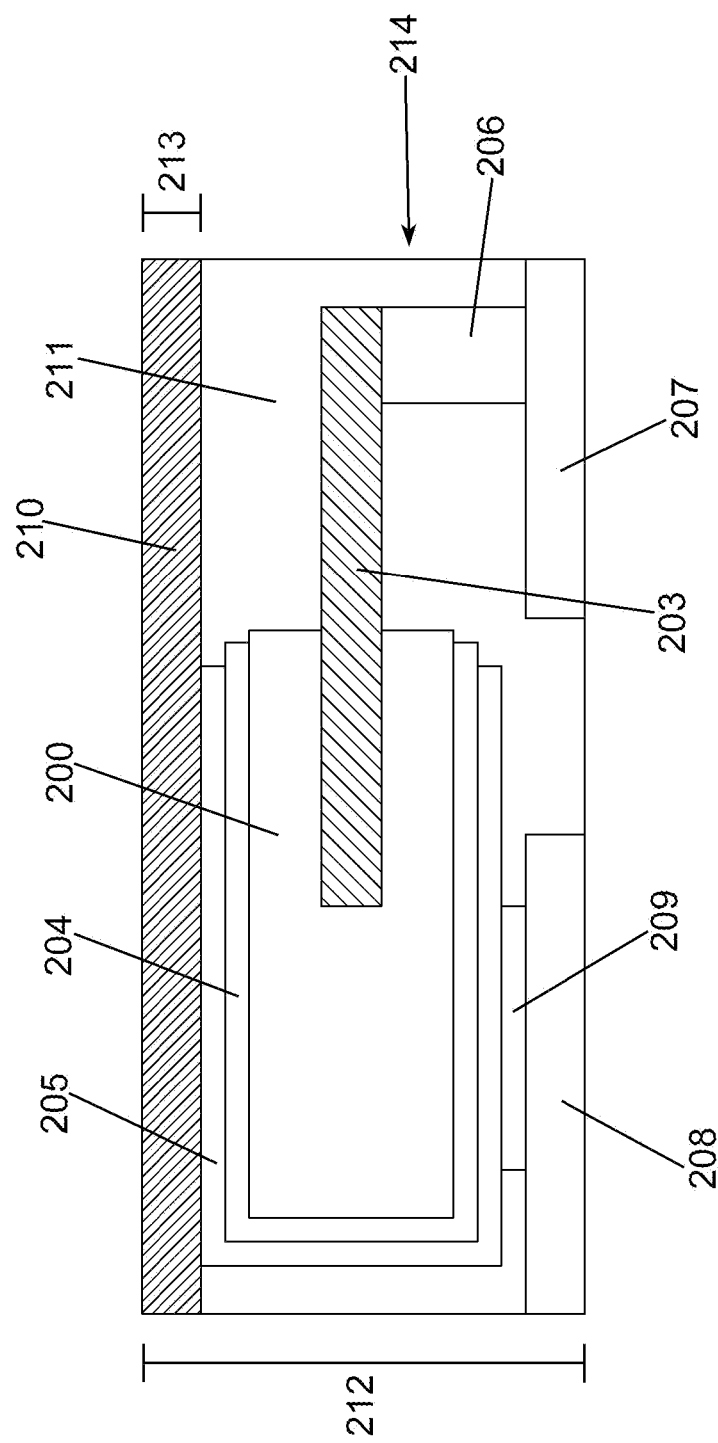
FIG. 2 is a cross-sectional schematic representation of an embodiment of the present invention.

FIG. 2 schematically illustrates an embodiment of the present invention. In FIG. 2, the capacitor, 214, comprises an anode, 200, and preferably a valve metal anode, with an anode lead, 203, represented as an anode wire, extending therefrom. A dielectric, 204, on at least a portion of the anode separates the anode from a cathode, 205. The anode lead, 203, is connected to anode leadframe tab, 206, typically by welding. The anode leadframe tab, 206, is connected to, or integral to, the anode leadframe, 207. The cathode, 205, is electrically connected to the cathode leadframe, 208, typically with conductive adhesive, 209. A membrane, 210, forms a top seal which, in concert with the encapsulant, 211, at least partially encases the capacitive element comprising the anode, anode lead, dielectric and cathode. The total device thickness, 212, is an accumulation of all of the components of the device including the membrane thickness, 213, which is more easily controlled, as it can be preformed, and the membrane forms a boundary in one direction within which the encapsulant is constrained.

Figure 3:
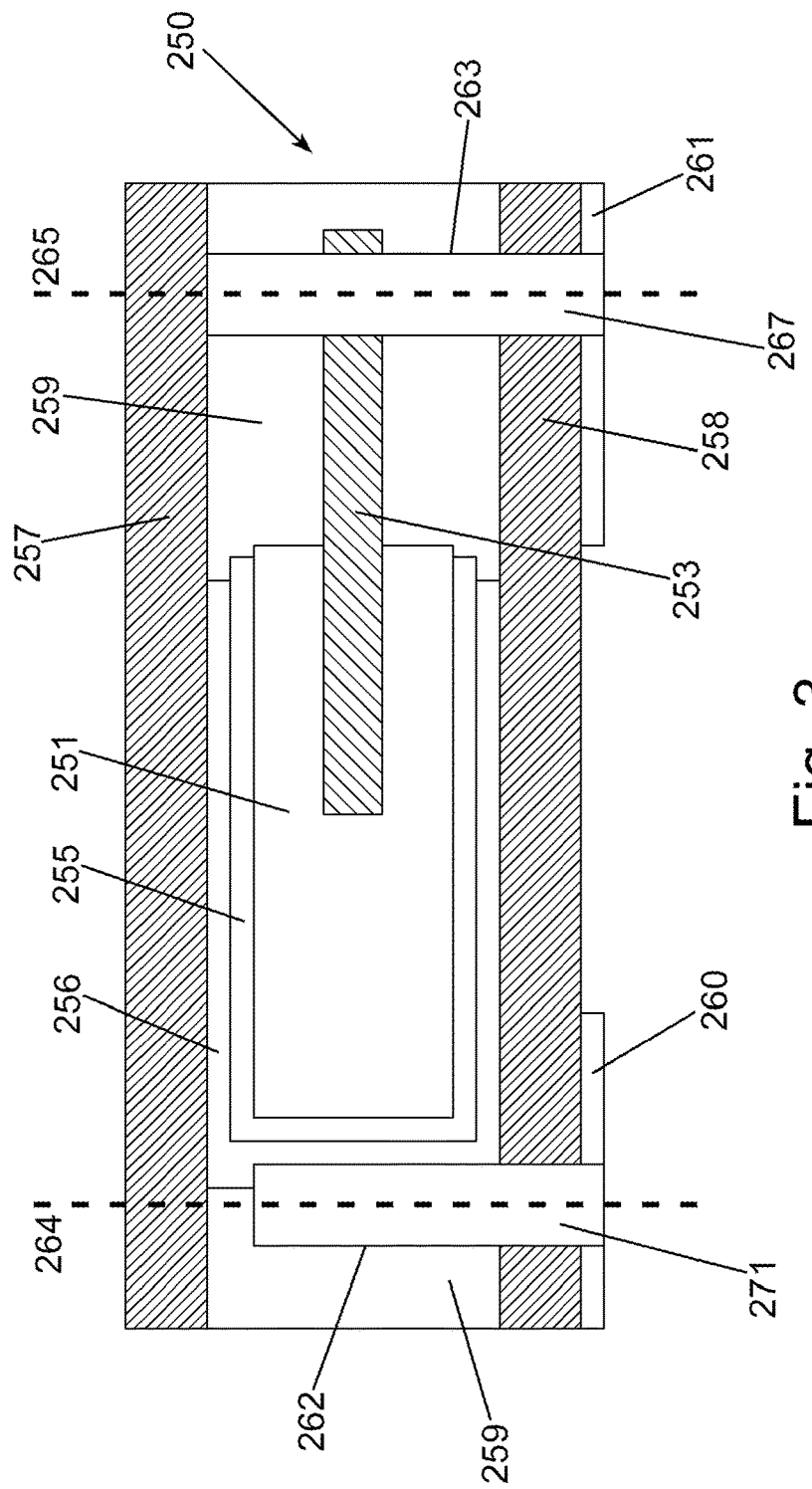
FIG. 3 is a cross-sectional schematic representation of an intermediate step of an embodiment of the invention.

FIG. 3 schematically illustrates an embodiment of the invention wherein the capacitor, 250, is represented at an intermediate step of the manufacturing process. In FIG. 3, the anode, 251, which is preferably a valve metal anode, has an anode lead, 253, extending therefrom. A dielectric, 255, on at least a portion of the anode separates the anode from a cathode, 256. A top membrane, 257, and a bottom membrane, 258, are positioned on opposite sides of the capacitive element in a sandwiched relationship. These membranes sandwich the capacitive element which is partially encased within the encapsulant, 259. Membranes, 257 and 258, work in concert with the encapsulant, 259, to at least partially encapsulate the capacitive element comprising the anode, anode lead, dielectric and cathode and form a pocket, or cavity, within which the encapsulant is contained during molding. It is preferred, but not limited thereto, that membranes comprise the same resin as the encapsulant, 259, or that the resin is incorporated into the membranes, 257 and 258 or emanate from the membrane. External anode and cathode terminals, 260 and 261, are adhered to the lower membrane, 258. An anode hole, 263, and cathode hole, 262, are formed within the external anode and cathode terminals, respectively, and through the membrane and encapsulant. The anode hole, 263, is formed in, and preferably through, the anode lead, 253, represented as an anode wire, and preferably to the top membrane. A metallization, 267, is formed in the anode hole such that the anode lead is electrically connected to the external anode terminal, and adhered to the encapsulant, 259. This metallization electrically connects the anode lead along the perpendicular cut portion of the anode lead so as to maximize the electrical connection area, without extending the hole size in the anode lead length direction. In an alternative embodiment the anode hole could reach the metal of the anode wherein the metallization of the anode hole directly electrically connects the anode and provides electrical connectivity to the external anode terminal. The metallization may be a single metal, an alloy, or a sequential series of metals to achieve adequate electrical conductivity. In this alternative embodiment the anode lead may or may not be present, and preferably the anode lead is not present so as to further improve the volumetric efficiency. The cathode hole, 262, is formed through a portion of the cathode, 256. The cathode hole, 262, is metalized to form an electrical connection between the cathode and external cathode terminal. Lines, 264 and 265, represent a preferred embodiment of the present invention, wherein the line represents the portion of the device that is cut so as to form a device with a defined length. The cutting process, typically dicing, preferable exposes a portion of the metalized holes, 262 and 263, thereby forming an end termination for the capacitor after cutting as will be realized from FIG. 4.

Figure 4:
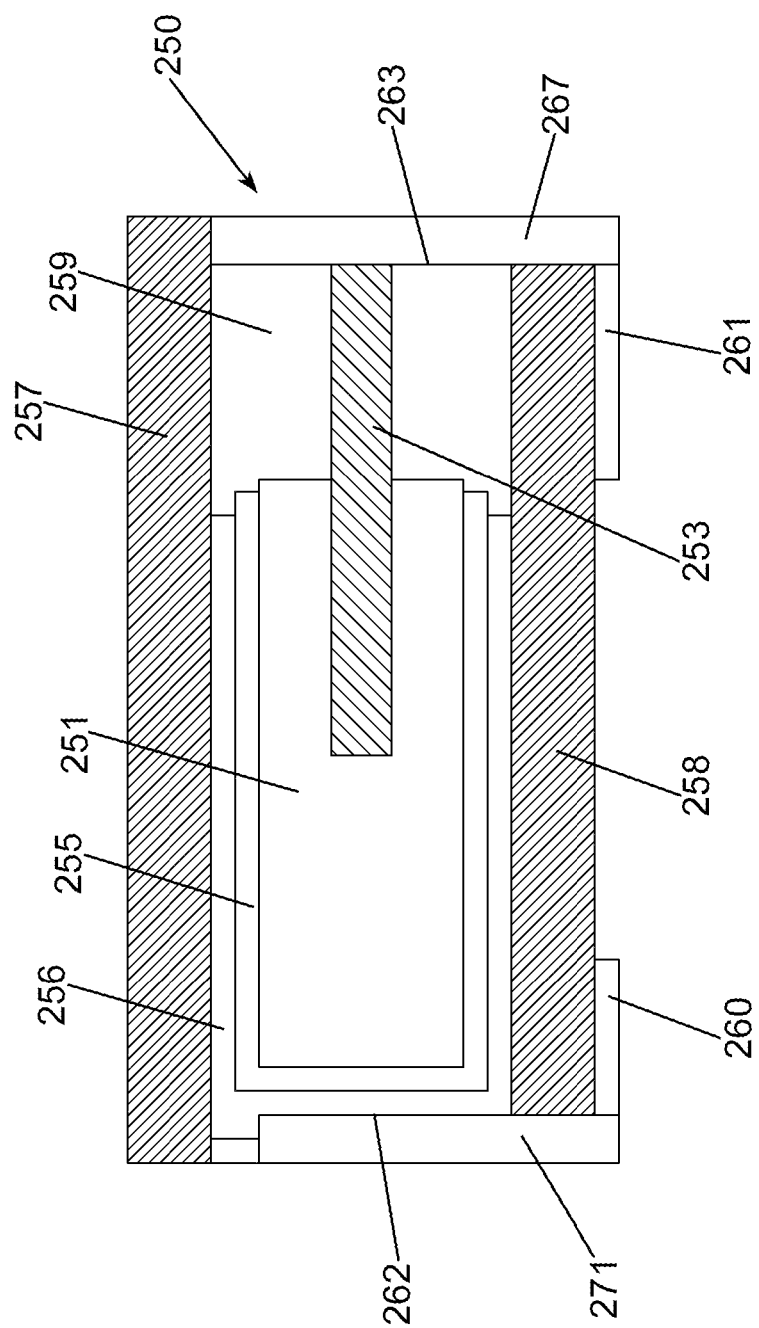
FIG. 4 is a cross-sectional schematic representation of an embodiment of the present invention.

FIG. 4 schematically illustrates the embodiment of FIG. 3 after cutting. In FIG. 4, the capacitor, 250, has an anode, 251, preferably a valve metal anode, with an anode lead, 253, represented as an anode wire, extending therefrom. A dielectric, 255, on at least a portion of the anode separates the anode from a cathode, 256. A top membrane, 257, and a bottom membrane, 258, are positioned on opposite sides of the capacitive element in sandwiched relationship. These membranes position the capacitive element within the encapsulant, 259, where membranes, 257 and 258, and encapsulant, 259, function in concert to at least partially encapsulate the capacitive element. It is preferred, but not limited thereto, that the membranes, 257 and 258, and encapsulant, 259, comprise a common resin and the resin may permeate one or both membranes. It is also further preferable in one embodiment, but not limited thereto, that a resin forming the lower membrane, 258, emanates from the membrane layer and fills in around the capacitive element between the membranes. External anode and cathode terminals, 261 and 260, are adhered to the encapsulant, 259. The remaining portions of the anode hole, 263, and cathode hole, 262, and metallization contained therein form conductive leads on a face of the capacitor and may function as a circuit trace to connect to additional functionality integral to, or on, the encapsulant.

Figure 5:
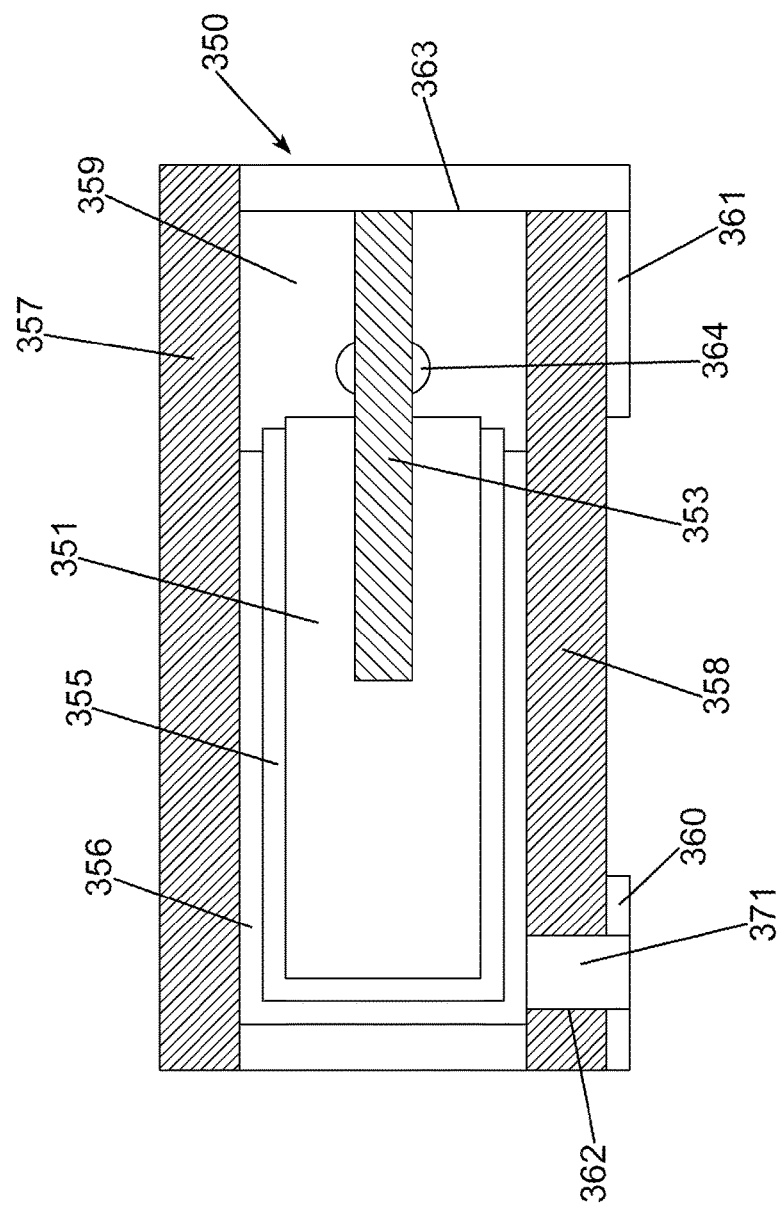
FIG. 5 is a cross-sectional schematic representation of an embodiment of the present invention.

FIG. 5 schematically illustrates an embodiment of the present invention. In FIG. 5, the capacitor, 350, comprises an anode, 351, and preferably a valve metal anode, with an anode lead, 353, represented as an anode wire, extending therefrom. A dielectric, 355, on at least a portion of the anode separates the anode from a cathode, 356. A top membrane, 357, and a bottom membrane, 358, are positioned on opposite sides of the capacitive element in a sandwiched relationship. These membranes position the capacitive element within the encapsulant, 359, where membranes, 357 and 358, are part of the encapsulation. In a preferred embodiment the resin that forms the encapsulant is also incorporated in the membranes, 357 and 358, and may impregnate the membranes. Alternatively, the resin forming the encapsulation may emanate from the membrane layer and fill in around the capacitive element to encapsulate the capacitive elements between the membranes. External anode and cathode terminals, 361 and 360, are adhered to the encapsulant, 359. An anode hole, 363, and cathode hole, 362, are formed within the external anode and cathode terminals, respectively, and through the encapsulant and lower membrane. The anode hole, 363, is formed through the anode lead, 353. A metallization is formed in the anode hole such that the anode lead, 353, is electrically connected to the external anode terminal, 361, and adhered to the surface of the encapsulation. This metallization electrically connects to the anode lead along the perpendicular cut portion of the anode lead so as to maximize the electrical connection area, without extending the hole size in the anode lead length direction. The cathode hole, 362, forms an electrical connection to the cathode, 356. The cathode hole, 362, is metallized, 371, to form an electrical connection between the cathode, 356, and external cathode terminal, 360. An isolation material, 364, is an optional feature included in the capacitive element. This isolation material prevents the cathode, 356, from forming over portions of the anode lead, 353. This isolation material is a material that is typically applied over a portion of the anode or anode lead so that the chemical processing that forms the cathode does not deposit cathode material in portions of the anode that will be part of the anode electrical attachment. This is preferably, but not limited to, a material such as a resin that forms a barrier.

Figure 6:
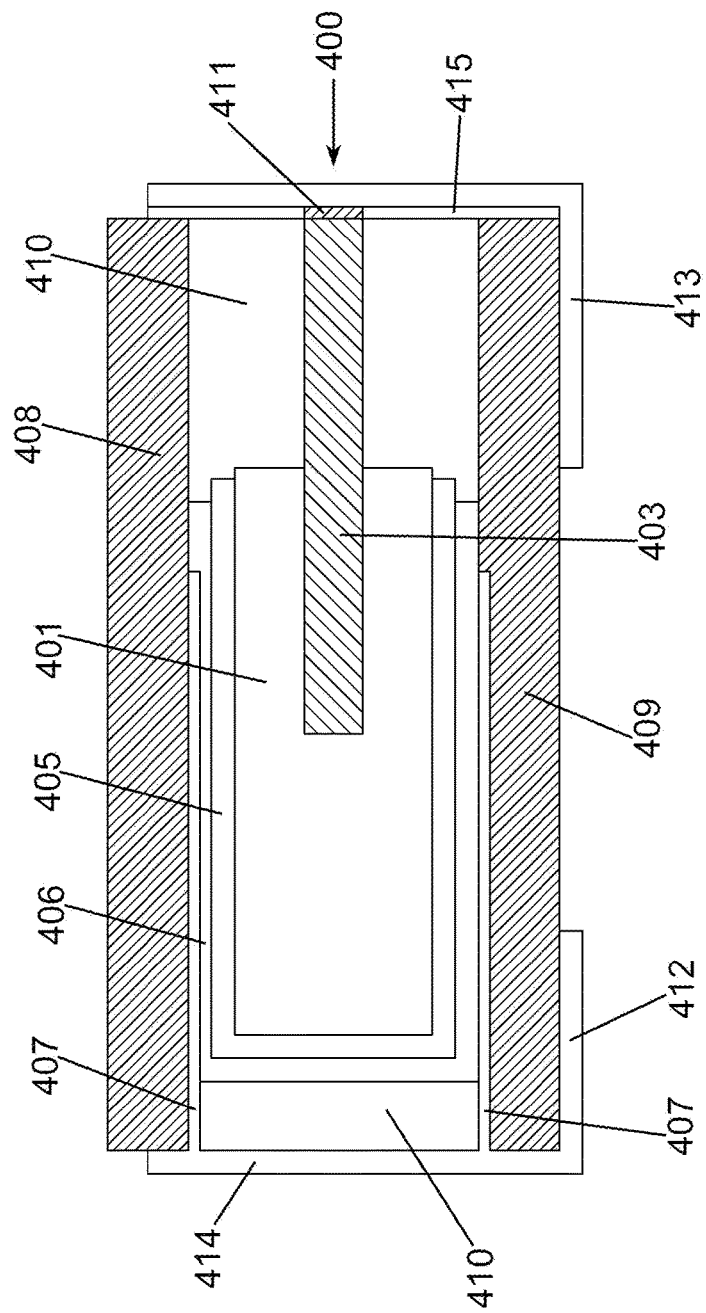
FIG. 6 is a cross-sectional schematic representation of an embodiment of the present invention.

FIG. 6 schematically illustrates an embodiment of the present invention. In FIG. 6, the capacitor, 400, comprises an anode, 401, preferably a valve metal anode with an anode lead, 403, represented as an anode wire, extending therefrom. A dielectric, 405, on at least a portion of the anode separates the anode from a cathode, 406. A current collecting cathode layer, 407, is attached to the cathode and extends to the edge of the encapsulant, 410, where they are exposed from one surface. The anode lead, 403, is also exposed preferably from another surface with exposure at the same surface contemplated. A top membrane, 408, and a bottom membrane, 409, are positioned on opposite sides of the capacitive element in sandwiched relationship. These membranes form part of an encasement and position the capacitive element(s) within the encapsulant, 410, where membranes, 408 and 409, are part of the encapsulation. It is preferred, but not limited thereto, that a resin of the encapsulant, 410, is also incorporated into the membranes, may impregnate the membrane and may emanate from the membrane. It is preferable, but not limited thereto, that the resin forming the encapsulation, 410, fills at least a part of the area around the capacitive element bound by the membranes and more preferable the entire area. The cathode current collecting layer(s) and the anode lead(s) are plated with a solderable material, 411. A preformed metal cathode terminal, 412, is attached to the solderable material on the cathode current collecting layers and a preformed metal anode terminal, 413, is attached to the solderable material, 411, on the anode lead. This attachment is preferably done by a solder, 414 and 415.

Figure 7:
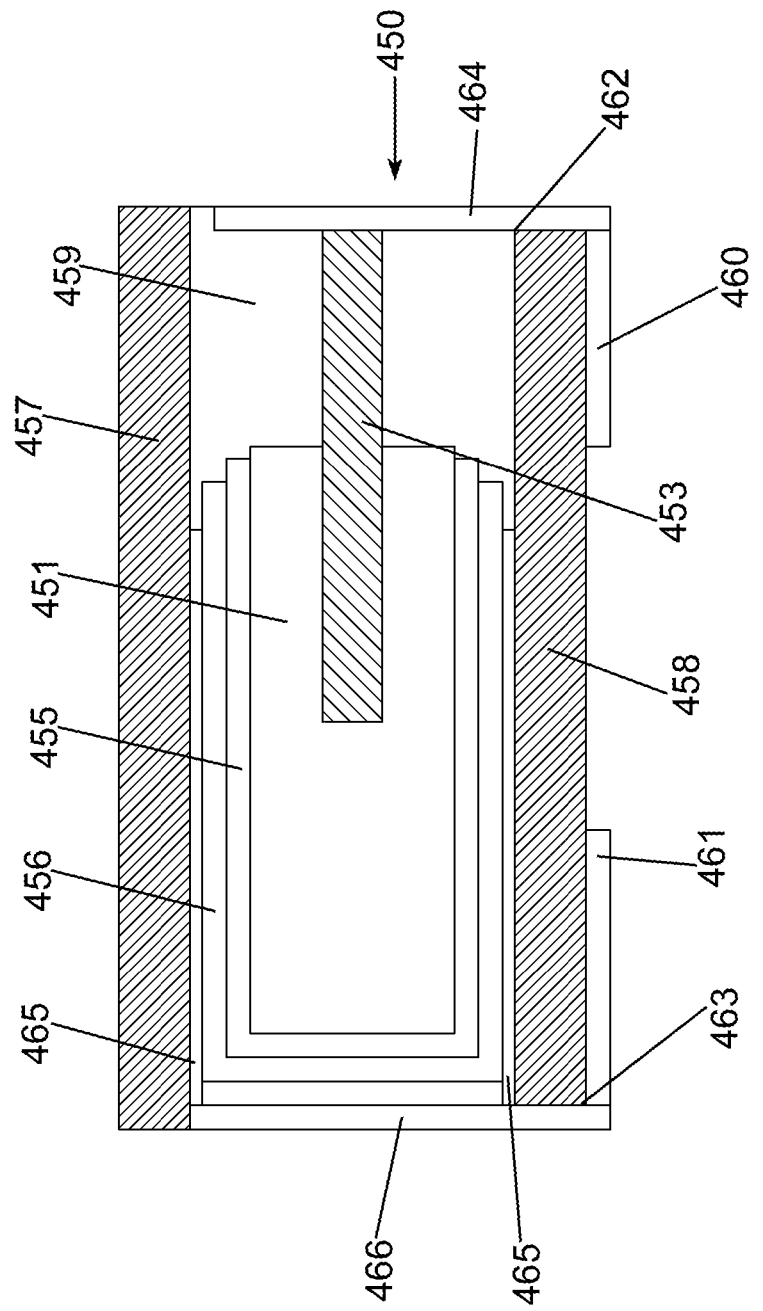
FIG. 7 is a cross-sectional schematic representation of an embodiment of the present invention.

FIG. 7 schematically illustrates an embodiment of the present invention. In FIG. 7, the capacitor, 450, comprises an anode, 451, and preferably a valve metal anode, with an anode lead, 453, represented as an anode wire, extending therefrom. A dielectric, 455, on at least a portion of the anode separates the anode from a cathode, 456. Cathode foils, 465, are electrically attached to the cathode, 456. A top membrane, 457, and a bottom membrane, 458, are positioned on opposite sides of the capacitive element in sandwiched relationship. These membranes position the capacitive element within the encapsulant, 459, where membranes, 457 and 458, and the encapsulant work in concert to form the encapsulation. It is preferred, but not limited thereto, that a resin of the encapsulant be incorporated into the membranes, 457 and 458, wherein the resin may impregnate the membranes or emanate from the membranes. It is also further preferable, but not limited thereto, that a resin at least partially fills the area between the membranes and preferably completely fills the area between the membranes thereby encasing the edge of the capacitive element. External anode and cathode terminals, 460 and 461, are adhered to the encapsulation preferably on the lower membrane. An anode hole, 462, and cathode hole, 463, are formed within the external anode and cathode terminals, respectively, and through the encapsulant and membrane. The anode hole, 462, is formed through the anode lead, 453. A metallization, 464, is formed in the anode hole such that the anode lead, 453, is connected to the external anode terminal, and adhered to the encapsulation preferably on the lower membrane. The metallization electrically connects the anode lead along the perpendicular cut portion of the anode lead to maximize the electrical connection area without extending the hole size in the anode lead length direction. The cathode hole, 463, is formed through a portion of the cathode foils, 465. The cathode hole, 463, is metalized, 466, to form an electrical connection between the cathode foils, 465, and external cathode terminal, 461.

In a preferred embodiment a capacitor comprising at least one anode comprising a valve metal or conductive oxide of a valve metal, and an anode wire. A dielectric is formed on the anode and a cathode layer is formed on the dielectric. The capacitive element is attached to a leadframe, wherein the anode lead is electrically attached to the leadframe on an anode portion of the leadframe and the cathode of the capacitive element is attached to the cathode portion of the leadframe, typically by conductive adhesive. A membrane layer is between the external capacitor device surface and the capacitive element on two, opposite sides of the device such that the membrane provides a fixed thickness of the encapsulant in the thickness dimension of the capacitor device.

In manufacturing the capacitor, the capacitive element and leadframe is presented into an encapsulant forming cavity with a membrane layer disposed on at least one, and preferably opposing sides, of the capacitive element and leadframe such that the membranes resist the encapsulant forming cavity in the device's thickness direction.

The region of the mold cavity that forms a limitation for the encapsulation material to flow during encapsulation, is further referred to as encapsulant forming cavity. This cavity can form any side of the device by limiting the flow of the encapsulation material. As is with the membrane, this cavity can further serve as the portion of the encapsulation cavity that contacts with the membrane to define the external position of any of the outside surfaces of the device. This would be analogous to what is known as the mold cavity wall. A portion of a cavity wherein the device external surfaces are defined by this cavity's internal shape. While this relates to a traditional mold cavity, the encapsulation forming cavity may also be a single surface, such as a plate or series of connected surfaces, that define only a portion of the external surface of the device.

The present invention provides for a determinate, and repeatable, thickness of an encapsulated capacitor. By utilizing a preformed membrane, and bringing the membrane to the surface of the capacitive element and mold cavity, the membrane effectively works in concert with a face of the capacitive element to form a cavity within which the encapsulant is constrained during molding while insuring the capacitive element is properly positioned within the encapsulant. In those directions where a membrane is not present the encapsulant may be restrained by the injection molding cavity. Exposure of the conductive components, either anode or cathode, allows for surface attachment of the termination onto the encapsulant, in electrical contact with the anode or cathode, thereby providing for a reduced thickness for the electrical connection and by use of the membrane a reduced thickness of encapsulant and a determinate and fixed thickness for the finished capacitor. In such a device the membrane provides a portion of the device thickness yet the encapsulant is formed in the cavity and can be compressed onto, or into, the device with a predetermined thickness dimension being achieved during the encapsulation process.

In a preferred embodiment the membrane layer is impregnated with encapsulating resin. It is particularly preferred that the encapsulating resin is the same as that used for the encapsulation due to the improved adhesion achieved thereby.

In a preferred embodiment a membrane, is provided between the cathode and external copper foil wherein the membrane is in physical contact with the capacitive element. After formation of either sandwiched arrangement a hole is formed through the copper foil and encapsulant such that it intersects the cathode of the capacitive element and another hole is formed through the encapsulant layers and through the anode lead. The holes are preferably formed from the same side of the external copper foil. The hole is metalized by way of plating that adheres to the encapsulant and forms an electrical connection with the perpendicular surface of the anode lead and the external copper foil. A similar metalized hole forms an electrical connection between the cathode of the capacitive element and the external copper foil. The external copper foil is preferably etched in a pattern that electrically disconnects the anode and cathode portions on the surface of the device so as to form terminals. The copper is then treated in such a way as to present it as a solderable surface.

In one embodiment a capacitor is provided that comprises a metalized hole on at least the anode portion of the capacitor. The metalized hole is partially exposed through a cutting process thereby providing a solderable surface at each terminal connection region, that is on a different side of the capacitor than the terminal portion of the device. It is common in the industry for surface mount capacitors to have a metallized surface perpendicular on a side other than the terminal face facing towards the mounting surface to create a solder fillet surface where the solder used to attach the terminal to the circuit board can form up the side of the capacitor. This allows for visual verification of successful soldering and ease of rework of the device. Furthermore, the fillet of solder creates a balance of force on each end of the capacitor to keep the part centered in the desired circuit board space during the solder reflow process. The exposed portion of the metalized hole is retained with the device in such a manner that the entirety of connection between the metallization and the anode lead is intact. As with prior art descriptions, where in the hole is only formed to the anode lead, retaining the entirety of the connection to the anode lead while exposing the metalized connections on the side surfaces of the device is impractical. To expose any portion of the metalized hole, so as to improve the volumetric efficiency, would require removal of at least a portion of the anode lead connection with the metallized layer. Removing any portion of the metalized connection to the anode lead will result in a loss of electrical performance. Further, the use of forming holes that have the metallization formed within, makes manufacturing the capacitor with a perpendicular solderable surface to the terminal surface more effective. It is common for users of surface mount capacitors to desire a solderable surface up the perpendicular face of the device that is less than the width of this surface in any direction. In the present invention this aspect can be controlled by the depth and width dimensions of the hole formed to be metalized. Other methods in the art only allow for this metallization between the anode lead and the terminal to be formed over the entire perpendicular face of the device. This is undesirable to users for many factors, including likelihood of shorting the device and improper soldering of the device.

The membrane layer is a layer that contacts a capacitive element to limit the thickness of the capacitor encapsulant wall between the capacitive element surface and one of the external surfaces of the capacitor device. By retaining the capacitive element within the membrane the risk of encapsulant encroaching onto untended areas, thereby rendering the encapsulant nonfunctional, is minimized.

The membrane can be any layer that, with sufficient processing, forms a space, limiting the encapsulant, wherein the encapsulant is bound on at least two sides by the an encapsulant forming cavity and a face of the capacitive element, during the encapsulation process, thereby limiting encroachment of an encapsulant forming cavity areas on the capacitive element surface. The encapsulant forming cavity is any surface which, when subjected to an encapsulation process, will act as a barrier to the encapsulant material and form a surface, which will become the external surface encasing at least a portion of the capacitive element when the device is removed from the cavity. When compressed to the capacitive element this membrane layer will contact the capacitive element surface and limit the distance between the encapsulant forming cavity and the capacitive element thereby defining the thickness of the encapsulation of the capacitor device.

In one embodiment the membrane is one that is porous thereby allowing encapsulant material to penetrate through the membrane layer while the membrane layer is in contact with the capacitive element surface on one face and the encapsulant forming cavity on the opposite face. The porous membrane could comprise a reinforcing material, or filler, such as glass weave, fibers, etched materials, or loose particles, that are all of controlled thickness.

In one embodiment the membrane comprises a solid film which may be impregnated with encapsulating resin or adhered to encapsulating resin.

In one embodiment the membrane is compressible. A compressible membrane can provide a fixed minimum distance between the capacitive element surface and the encapsulant forming cavity in compressed form and could be retained in compressed form by the encapsulant material or allowed to spring back. A compressible membrane provides a more uniform distribution of force across the capacitive element, or parallel capacitive elements within the same encapsulant forming cavity, such that the capacitive element is retained within a fixed distance from the encapsulant forming cavity while serving to reduce the force exerted on the capacitive element.

The membrane layer can be applied to a multitude of surfaces of the capacitive element so as to take advantage of the thickness limiting nature of the membrane for dimensions of the device other than the thickness.

In some embodiments an adhesive, or encapsulant material, can be between the capacitive element and membrane thereby adhering the membrane to the capacitor face. This resin or adhesive portion may secure the membrane to the capacitor face, and as such also becomes part of the thickness limiting function of the membrane.

It is typically not necessary that all surfaces of the membrane and the capacitive element be in contact while the membrane is providing sufficient contact to form the fixed thickness between the cavity and the capacitive element. As the membrane is forced toward the capacitive element only portions of the capacitive element and membrane may contact to form the required action of the membrane. Also small amounts of encapsulant material may be present on all portions of membrane due to the surface tension and adhesion to the membrane and as it contacts the capacitive element it forms part of the membrane function.

It is preferable that the hole be of sufficient depth and cross-sectional area as to provide an exposed anode lead by forming a hole through, preferably completely through, the anode lead instead of reaching the closest approach of the anode lead. Forming the hole through the anode lead exposes a cross sectional portion of the anode lead thereby increasing the electrical contact area of the metallization on the anode lead, without the increase in length along one direction of the anode lead thereby achieving improved volumetric efficiency of the device by achieving greater contact area without occupying significant length of the device. Another preferable advantage of forming the hole through anode lead is that the process allows for multiple anodes leads to be connected through the same hole thereby having common metallization for a group of capacitors. Providing multiple anodes, and thus anode leads in a common package is an advantage when additional capacitance or reduced resistance is required. It would also be preferable that the hole formed on the cathode portion of the device pass through the cathode to increase this connection, however, this is not required. The cathode layer typically traverses the majority of the length and width of the anode and thus has more surface area to contact during metallization without detriment to the volumetric efficiency.

The hole is formed by any technique known in the art and the metallization is accomplished by a method selected from plating, sputtering, deposition, sintering, diffusion, coating, and applying a conductive material, preferably a metal, in the hole.

The cathode layers are not limited herein and are consistent with those commonly found in the capacitor industry including cathode layers comprising conductive polymer, or manganese dioxide, on the dielectric of the anode. The conductive polymer layer can be formed by many methods known in the art such as, in situ polymerization, one pot polymerization, electrochemical polymerization, or prepolymerized polymer dips. Particularly preferred conductive polymers are polyanilines, polypyrroles, polythiophenes and derivatives thereof. A preferred polymer for demonstration of the invention is poly-3,4-ethylenedioxythiophene. Additional cathode layers are preferably formed on the conductive polymer layer or manganese dioxide layer to facilitate connecting thereto with carbon containing layers and metal containing layers being particularly suitable for demonstration of the invention. Carbon containing layers typically include conductive carbon in a resin. Metal containing layers typically include a metal filled resin layer, with resin containing silver flake being an example, or the metal containing layer may be a metal plating. It is preferable that the cathode layer be formed with metal plating as the process of metalizing the cathode layer within the cathode hole portion is simplified. A metal foil may be incorporated into the cathode. The metal foil may be attached to other cathode layers with various methods of electrical and physical attachment, including but not limited to, conductive adhesive, soldering, brazing, or welding. These cathode foils act as part of the cathode that delivers current to and from internal cathode layers. This cathode foil is preferably made of a metal such as but not limited to, copper, silver, stainless steel, or other conductive materials.

Terminals on the external surface of the device are employed to provide locations of electrical connection between the device and the electrical circuit. Terminals are typically made of a metal that is bondable by methods common in the industry. Such methods include, but are not limited to, soldering, wire bonding, brazing, welding, ultrasonic attachment, and copper pillar boding. The terminals are typically formed as a leadframe in some embodiments, by a metal foil in other embodiments, or a layer that is part of the device on the external surface of the device, such as made by plating. The most preferable metal for the terminals is copper due to its conductivity and other process advantages, but other metals or materials could serve as the terminal material, including but not limited to, nickel, stainless steel, metal filled polymers, conductive polymers, or similar. Terminals are typically square in shape to meet industry standards for placement on PCB soldering positions but this is not a limitation of the invention. The terminations may provide an electrical path between one or more portions of the external surface of the device and other external surface portions of the device. This would be commonly known in the industry as traces. Electrical paths formed on the surface of a device to connect a portion of the metallization that connects to the capacitive elements internal of the encapsulant, with other portions or surfaces of the encapsulant wherein terminals may be present. Providing these traces may simplify or provide electrical benefit by allowing the hole for metallization to be formed on or in one portion of the device while providing terminal(s) on other portions of the device, with or without the traces also being part of the connection portion of the terminal.

It is known to one skilled in the art that forming a sufficient metallization to a valve metal may require additional processing of the valve metal. In some cases, this is part of the metallization technique and is not apparent in the device as only the valve metal and metallization would be apparent. In some cases, the valve metal is difficult enough to metalize that it requires an additional step and material to prepare the valve metal. In such a case a portion of the anode, preferably but not limited to the anode lead, is treated in such a way so as to form a metallurgical bond to the valve metal with a material that is compatible with the hole metallization. This treatment may form an electrical bonding layer that promotes the electrical attachment performance of the metallization to the valve metal.

It is known to one skilled in the art that an encapsulant is typically formed from a resin and filler. The filler provides a method to control the coefficient of thermal expansion by displacing a portion of the resin in the encapsulant structure. It is hereby noted that though this is the typical art for encapsulation this present invention is not limited to the encapsulant being a resin or a resin filled system. Other encapsulant materials and methods are also applicable to the present invention.

The anode is a conductor, preferably a metal and preferably a valve metal selected from tantalum, aluminum, niobium, titanium, zirconium, hafnium, alloys of these elements, or a conductive oxide thereof such as NbO.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:
1. A capacitor comprising:
   a capacitive element comprising:
      an anode;
      a dielectric on said anode; and
      a cathode on said dielectric;

an encapsulant at least partially encasing said capacitive element wherein said encapsulant comprises a resin and at least one membrane between said capacitive element and an external surface of said encapsulant wherein said resin is incorporated in said membrane.

2. The capacitor of claim 1 further comprising at least one anode lead in electrical contact with said anode.

3. The capacitor of claim 2 wherein said anode lead is an anode wire.

4. The capacitor of claim 1 further comprising an anode termination on a surface of said encapsulant wherein said anode termination is in electrical contact with said anode.

5. The capacitor of claim 4 wherein said electrical contact comprises a metallized hole.

6. The capacitor of claim 5 wherein said metallized hole extends through an anode lead.

7. The capacitor of claim 6 wherein said anode lead is an anode wire.

8. The capacitor of claim 5 wherein said metallized hole is exposed on a surface of said capacitor.

9. The capacitor of claim 5 further comprising a second membrane opposite said membrane wherein said metallized hole extends into at least a portion of said anode and into a portion of said encapsulant.

10. The capacitor of claim 1 further comprising at least one of an anode terminal or a cathode terminal.

11. The capacitor of claim 10 wherein at least one of said anode terminal or said cathode terminal are exposed through a surface of said encapsulant.

12. The capacitor of claim 10 wherein at least one of said anode terminal or said cathode terminal are on a surface of said encapsulant.

13. The capacitor of claim 12 wherein said cathode terminal is in electrical contact with said cathode.

14. The capacitor of claim 1 comprising multiple said capacitive elements.

15. The capacitor of claim 1 wherein said cathode comprises at least one of a conductive polymer or a conductive metal oxide.

16. The capacitor of claim 15 wherein said conductive metal oxide comprises manganese dioxide.

17. A capacitor of claim 1 wherein said anode comprises a valve metal or conductive oxide of a valve metal.

18. A capacitor of claim 17 wherein said valve metal or valve metal oxide is selected from the group consisting of Al, W, Ta, Nb, Ti, Zr, Hf and conductive oxides thereof.

19. The capacitor of claim 1 further comprising a plated layer in electrical contact with one of said cathode or said anode.

20. The capacitor of claim 19 wherein said plated layer is a circuit trace.

21. The capacitor of claim 19 wherein said membrane is between said cathode and said plated layer.

22. The capacitor of claim 1 wherein said membrane comprises a reinforcing material.

23. A capacitor comprising:
a capacitive element comprising:
an anode;
an anode lead extending from said anode;
a dielectric on said anode; and
a cathode on said dielectric;
an encapsulant on at least a portion of said capacitive element;
an anode terminal on a face of said encapsulant; and
a first metallized hole through said encapsulant wherein said first metallized hole extends through said anode lead and electrically connects said anode lead and said anode terminal.

24. The capacitor of claim 23 wherein said anode lead is an anode wire.

25. The capacitor of claim 23 wherein said encapsulant comprises at least one membrane.

26. The capacitor of claim 25 wherein said membrane comprises a reinforcing material.

27. The capacitor of claim 23 further comprising a cathode termination on a surface of said encapsulant wherein said cathode termination is in cathodic electrical contact with said cathode.

28. The capacitor of claim 27 wherein said cathodic electrical contact is a second metallized hole.

29. The capacitor of claim 27 wherein said cathode termination comprises a metal layer.

30. The capacitor of claim 29 wherein said metal layer is a plated metal layer.

31. The capacitor of claim 29 wherein said metal layer is on said encapsulant.

32. The capacitor of claim 23 wherein said anode comprises a valve metal or conductive oxide of a valve metal.

33. The capacitor of claim 32 wherein said valve metal or valve metal oxide is selected from the group consisting of Al, W, Ta, Nb, Ti, Zr, Hf and conductive oxides thereof.

34. The capacitor of claim 23 further comprising a plated layer in electrical contact with one of said cathode or said anode.

35. The capacitor of claim 34 wherein said encapsulant is between said capacitive element and said plated layer.

36. The capacitor of claim 35 wherein said plated layer is a circuit trace.

37. The capacitor of claim 23 comprising multiple said capacitive elements.

38. The capacitor of claim 23 wherein said cathode comprises at least one of a conductive polymer or a conductive metal oxide.

39. The capacitor of claim 38 wherein said conductive metal oxide comprises manganese dioxide.

40. A method for forming a capacitor comprising:
forming a capacitive element comprising:
an anode;
a dielectric on said anode; and
a cathode on said dielectric;
applying a membrane to said capacitive element; and
encapsulating at least a portion said capacitive element in an encapsulant wherein said membrane forms an outer boundary within which at least a portion of said encapsulant is constrained.

41. The method for forming a capacitor of claim 40 further comprising forming a hole through said encapsulant.

42. The method for forming a capacitor of claim 41 wherein said hole extends through at least a portion of an anode lead wherein said anode lead is in electrical contact with said anode.

43. The method for forming a capacitor of claim 42 wherein said anode lead is an anode wire.

44. The method for forming a capacitor of claim 42 further comprising forming a metallization in said hole wherein said metallization is in electrical contact with said anode lead.

45. The method for forming a capacitor of claim 40 further comprising forming an anode termination exterior to said encapsulant.

46. The method for forming a capacitor of claim 45 wherein said anode termination is in electrical contact with said anode.

47. The method for forming a capacitor of claim 46 wherein said electrical contact comprises a metallization through said encapsulant.

48. The method for forming a capacitor of claim 47 wherein said metallization is selected from the group consisting of plating, sputtering, vapor deposition, sintering diffusion and coating.

49. The method for forming a capacitor of claim 40 further comprising applying a conductive layer to a surface of said encapsulant wherein said conductive layer is in electrical contact with said cathode or said anode.

50. The method for forming a capacitor of claim 49 wherein said conductive layer comprises a metal foil.

51. The method of forming a capacitor of claim 49 wherein said conductive layer is a lead frame.

52. The method for forming a capacitor of claim 49 wherein said electrical contact comprises a metallization.

53. The method for forming a capacitor of claim 52 wherein metallization is in a hole through said encapsulant.

54. The method for forming a capacitor of claim 40 further comprising applying at least one said membrane to said capacitive element forming a cavity wherein said encapsulating includes placing said encapsulant in said cavity.

55. The method for forming a capacitor of claim 40 further comprising applying a conductive layer to a surface of said encapsulant.

56. The method of forming a capacitor of claim 55 wherein said conductive layer is a lead frame.

57. The method of forming a capacitor of claim 56 wherein said lead frame is in electrical contact with one of said anode or said cathode.

58. The method for forming a capacitor of claim 40 wherein said anode comprises a valve metal or conductive oxide of a valve metal.

59. The method for forming a capacitor of claim 58 wherein said valve metal or valve metal oxide is selected from the group consisting of Al, W, Ta, Nb, Ti, Zr, Hf and conductive oxides thereof.

60. The method for forming a capacitor of claim 40 wherein said cathode comprises at least one of a conductive polymer or a conductive metal oxide.

61. The method for forming a capacitor of claim 60 wherein said conductive metal oxide comprises manganese dioxide.

62. The method for forming a capacitor of claim 40 wherein said membrane is a preformed membrane.

63. The method for forming a capacitor of claim 40 wherein said membrane is impregnated with encapsulating resin.

64. The method for forming a capacitor of claim 63 wherein said encapsulating resin is said encapsulant.

65. A capacitor comprising:
a capacitive element comprising:
an anode;
a dielectric on said anode; and
a cathode on said dielectric;
an encapsulant at least partially encasing said capacitive element wherein said encapsulant comprises at least one membrane between said capacitive element and an external surface of said encapsulant wherein said membrane is in contact with said capacitive element.

* * * * *